(12) United States Patent
Zysman

(10) Patent No.: US 9,108,737 B2
(45) Date of Patent: Aug. 18, 2015

(54) NACELLE SCOOP INLET

(75) Inventor: Steven H. Zysman, Amston, CT (US)

(73) Assignee: United Technologies Corporation, Hartford, CT (US)

( * ) Notice: Subject to any disclaimer, the term of this patent is extended or adjusted under 35 U.S.C. 154(b) by 344 days.

(21) Appl. No.: 13/593,842

(22) Filed: Aug. 24, 2012

(65) Prior Publication Data

US 2014/0053532 A1 Feb. 27, 2014

(51) Int. Cl.
*B64D 33/00* (2006.01)
*F02C 7/12* (2006.01)
*F02C 9/18* (2006.01)
*B64D 29/00* (2006.01)
*F02C 7/04* (2006.01)
*B64D 33/08* (2006.01)
*B64D 33/02* (2006.01)

(52) U.S. Cl.
CPC .............. *B64D 33/00* (2013.01); *B64D 29/00* (2013.01); *F02C 7/04* (2013.01); *F02C 7/12* (2013.01); *F02C 9/18* (2013.01); *B64D 33/08* (2013.01); *B64D 2033/024* (2013.01); *Y02T 50/675* (2013.01); *Y10T 137/0536* (2015.04)

(58) Field of Classification Search
CPC .......... B64D 2033/0226; B64D 29/00; B64D 33/00; F02C 7/04; F02C 7/12; F02C 9/18
USPC ................ 244/53 B; 137/15.1; 60/226.1, 262
See application file for complete search history.

(56) References Cited

U.S. PATENT DOCUMENTS

| | | | |
|---|---|---|---|
| 4,782,658 A | 11/1988 | Perry | |
| 5,279,109 A | 1/1994 | Liu et al. | |
| 5,284,012 A | 2/1994 | Laborie et al. | |
| 5,351,476 A | 10/1994 | Laborie et al. | |
| 5,586,431 A | 12/1996 | Thonebe et al. | |
| 6,050,527 A * | 4/2000 | Hebert et al. | 244/210 |
| 7,607,308 B2 | 10/2009 | Kraft et al. | |
| 7,665,310 B2 | 2/2010 | Laborie et al. | |
| 7,967,550 B2 | 6/2011 | Grevsen et al. | |
| 2007/0130912 A1 * | 6/2007 | Kraft et al. | 60/226.1 |

FOREIGN PATENT DOCUMENTS

EP 1998027 A2 12/2008

OTHER PUBLICATIONS

International Search Report and Written Opinion for International Application No. PCT/US2013/055935 completed on May 23, 2014.
International Preliminary Report on Patentability for PCT Application No. PCT/US2013/055935 mailed on Mar. 5, 2015.

* cited by examiner

*Primary Examiner* — William H Rodriguez
*Assistant Examiner* — Scott Walthour
(74) *Attorney, Agent, or Firm* — Carlson, Gaskey & Olds, PC

(57) ABSTRACT

A scoop inlet for use in a gas turbine engine nacelle has a scoop inlet, and a tab extending forwardly of the scoop inlet. The scoop communicates with a downstream flowpath. The tab has at least one opening at a location upstream of the scoop inlet. A nacelle and a gas turbine engine are also disclosed.

13 Claims, 7 Drawing Sheets

NACELLE SCOOP INLET

BACKGROUND OF THE INVENTION

This application relates to improvements in a ram air scoop for use on a gas turbine nacelle.

Gas turbine engines are known, and typically include a fan delivering a portion of air into a core engine leading to a compressor. The compressor compresses the air and delivers it into a combustor where it is mixed with fuel and ignited. Products of this combustion pass downstream over turbine rotors, driving the turbine rotors to rotate.

Another portion of the fan's air is delivered into a nacelle, or outer housing which defines a bypass air flowpath between an outer core engine housing and the outer housing of the nacelle. This bypass air provides propulsion for an aircraft that mounts the gas turbine engine.

Historically a low pressure turbine has driven a low pressure compressor and the fan generally at the same speed. More recently, it has been proposed to incorporate a gear drive between the low pressure compressor and the fan such that the two can rotate at different speeds. With this advancement, the bypass duct has become significantly larger.

A portion of the bypass air is tapped for use as cooling air at various locations in the engine. Flush inlets and holes have been provided generally in the inner wall of the nacelle, or the outer core engine housing, to provide this cooling air. However, with the larger bypass ducts, and the change in fan speed, ram air scoops may be required. There are challenges with such scoops, particularly at the inlet, due to boundary layer issues in the nacelle.

In particular, FIG. 2 shows a nacelle 15 having a nacelle outer wall 80 spaced from an inner wall 82. Inner wall 82 may be a core engine outer wall. In the prior art, there have been cooling air taps 84 spaced at various locations in the nacelle 15.

Scoop air inlets such as 86 have been incorporated into the inner wall 82 of the nacelle to provide cooling air to various systems and heat exchangers on the gas turbine engine. An inlet 88 taps a portion of the bypass air B.

FIG. 3 shows a concern with such a prior art scoop 86. A boundary layer 90 is created as the bypass air approaches the inlet 88. As the bypass air enters the inlet 88, there is flow reversal 93 at areas immediately adjacent to an outer surface of the inner wall 82, such as surface 99 of a portion of the scoop 86 leading into the inlet 88. Flow reversal 93 causes a region of flow separation 94 downstream of the inlet 88, and limits the amount of air passing at 96 to a downstream user 98 of the cooling air.

SUMMARY OF THE INVENTION

In a featured embodiment, a scoop inlet for use in a gas turbine engine nacelle has a scoop inlet, and a tab extending forwardly of the scoop inlet. The scoop inlet communicates with a downstream flowpath. The tab is provided with at least one opening at a location upstream of the scoop inlet.

In another embodiment according to the previous embodiment, the opening is a single slot.

In another embodiment according to any of the previous embodiments, a flow diverter is positioned on a downstream end of the slot, and extends radially inwardly of an inner face of the tab.

In another embodiment according to any of the previous embodiments, the opening is a plurality of perforated holes in the tab.

In another embodiment according to any of the previous embodiments, the opening is at a location where a boundary layer profile will have formed from air moving the scoop inlet.

In another featured embodiment, a nacelle has an outer wall, and an inner wall spaced radially inwardly of the nacelle outer wall. A scoop inlet delivers air from a bypass duct defined between the nacelle inner and outer walls, and for communicating the air radially inwardly of the inner wall to a downstream user. The inner wall is provided with at least one opening at a location upstream of the scoop inlet.

In another embodiment according to the previous embodiment, the opening is a single slot.

In another embodiment according to any of the previous embodiments, a flow diverter is positioned on a downstream end of the slot, and extends radially inwardly of an inner face of the tab.

In another embodiment according to any of the previous embodiments, the opening is a plurality of perforated holes in the tab.

In another embodiment according to any of the previous embodiments, the opening is at a location where a boundary layer profile will have formed from air moving into the scoop inlet.

In another embodiment according to any of the previous embodiments, the scoop has a tab extending upstream of the scoop inlet. The opening is formed in the tab.

In another featured embodiment, a gas turbine engine has a fan for delivering air into a nacelle, and into an inner core, a compressor and a turbine in the inner core. The nacelle has a nacelle outer wall and a nacelle inner wall spaced radially inwardly of the nacelle outer wall. A scoop inlet delivers air from a bypass duct defined between the nacelle inner and outer walls, and communicates the air radially inwardly of the inner wall to a downstream user. At least one opening is at a location upstream of the scoop inlet.

In another embodiment according to the previous embodiment, the opening is a single slot.

In another embodiment according to any of the previous embodiments, a flow diverter is positioned on a downstream end of the slot, and extends radially inwardly of an inner face of the tab.

In another embodiment according to any of the previous embodiments, the opening is a plurality of perforated holes in the tab.

In another embodiment according to any of the previous embodiments, the opening is at a location where a boundary layer profile will have formed from air moving into the scoop inlet.

In another embodiment according to any of the previous embodiments, the scoop has a tab extending upstream of the scoop inlet. The opening is formed in the tab.

In another embodiment according to any of the previous embodiments, a pressure difference exists between the bypass duct and an area radially inward of the inner wall.

These and other features of this application will be best understood from the following specification and drawings, the following of which is a brief description.

DETAILED DESCRIPTION

Figure 1:
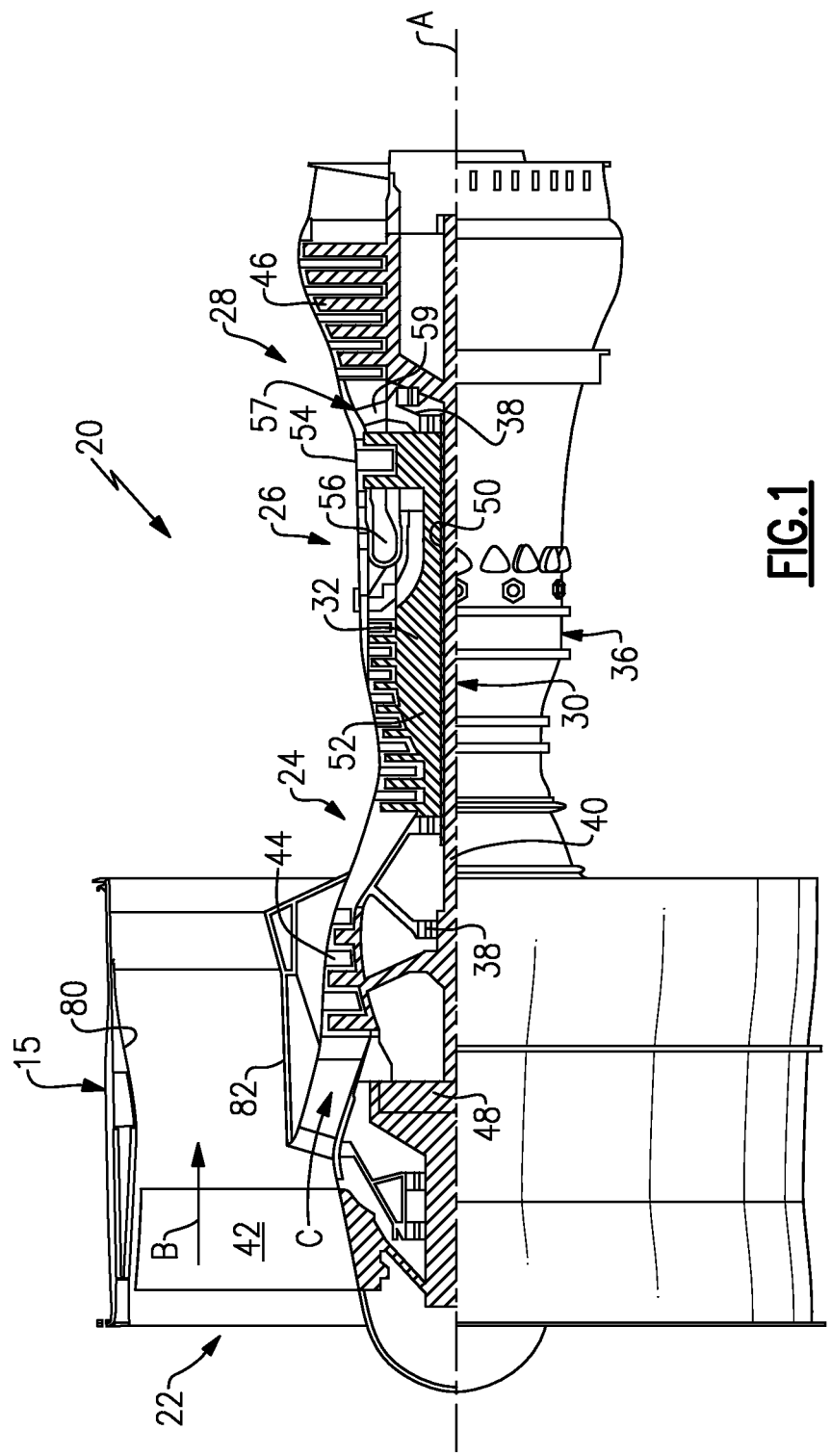
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B in a duct within nacelle 15, while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/(518.7)^0.5]. The "Low corrected fan tip speed" as disclosed herein according to one non-limiting embodiment is less than about 1150 ft/second.

Figure 2:
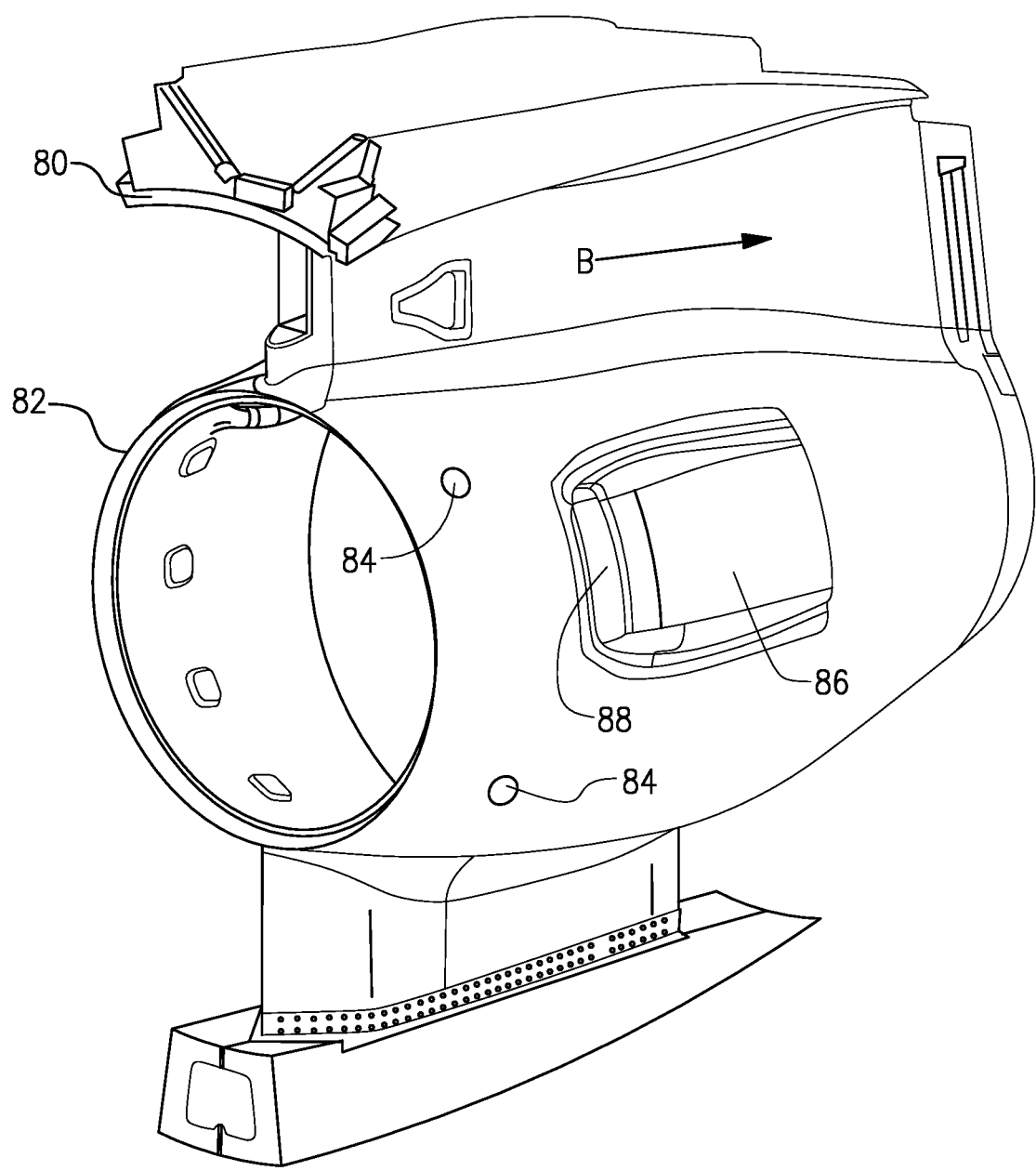
FIG. 2 shows a prior art nacelle.
Figure 3:
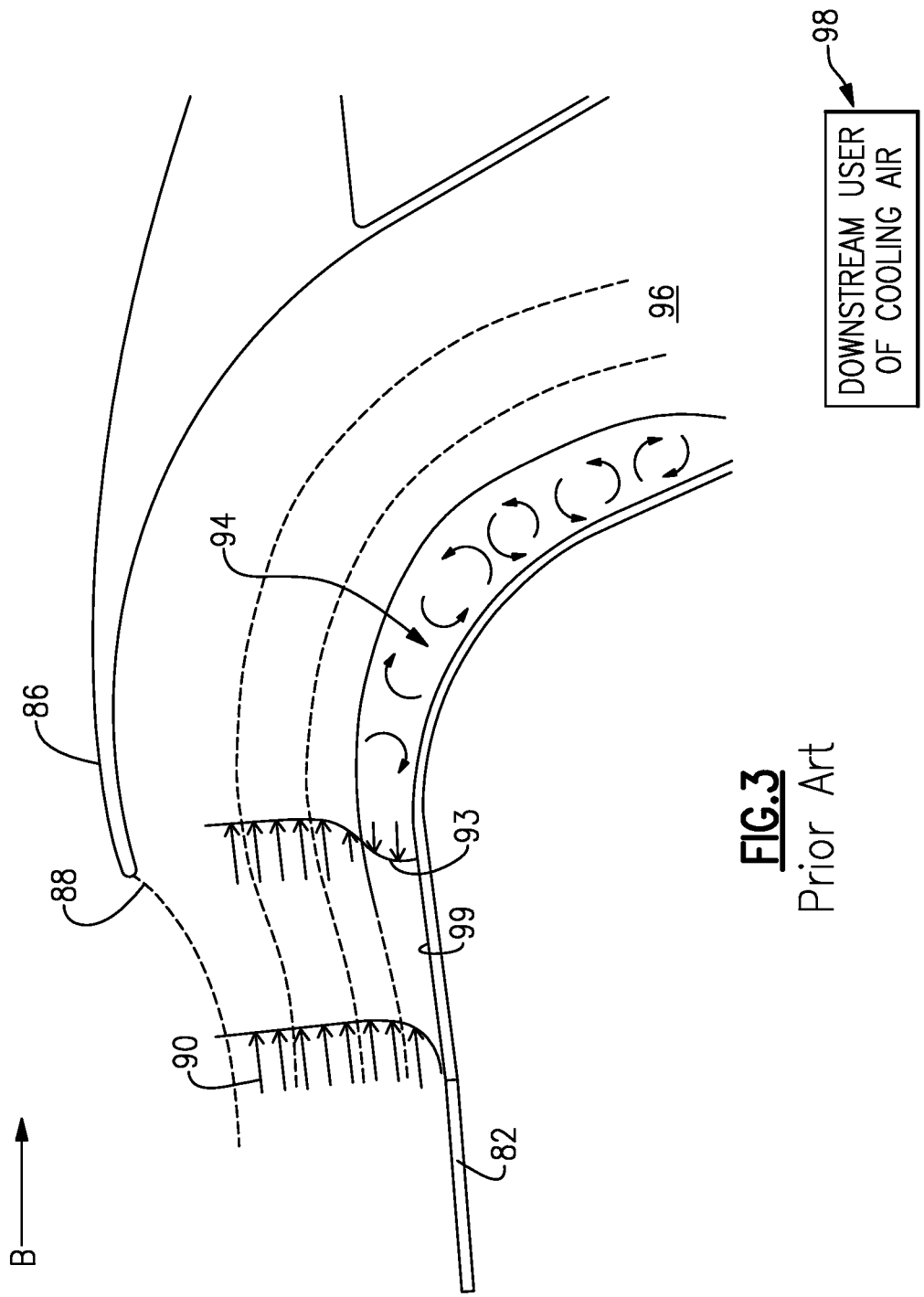
FIG. 3 shows flow challenges with the prior art nacelle.
Figure 4:
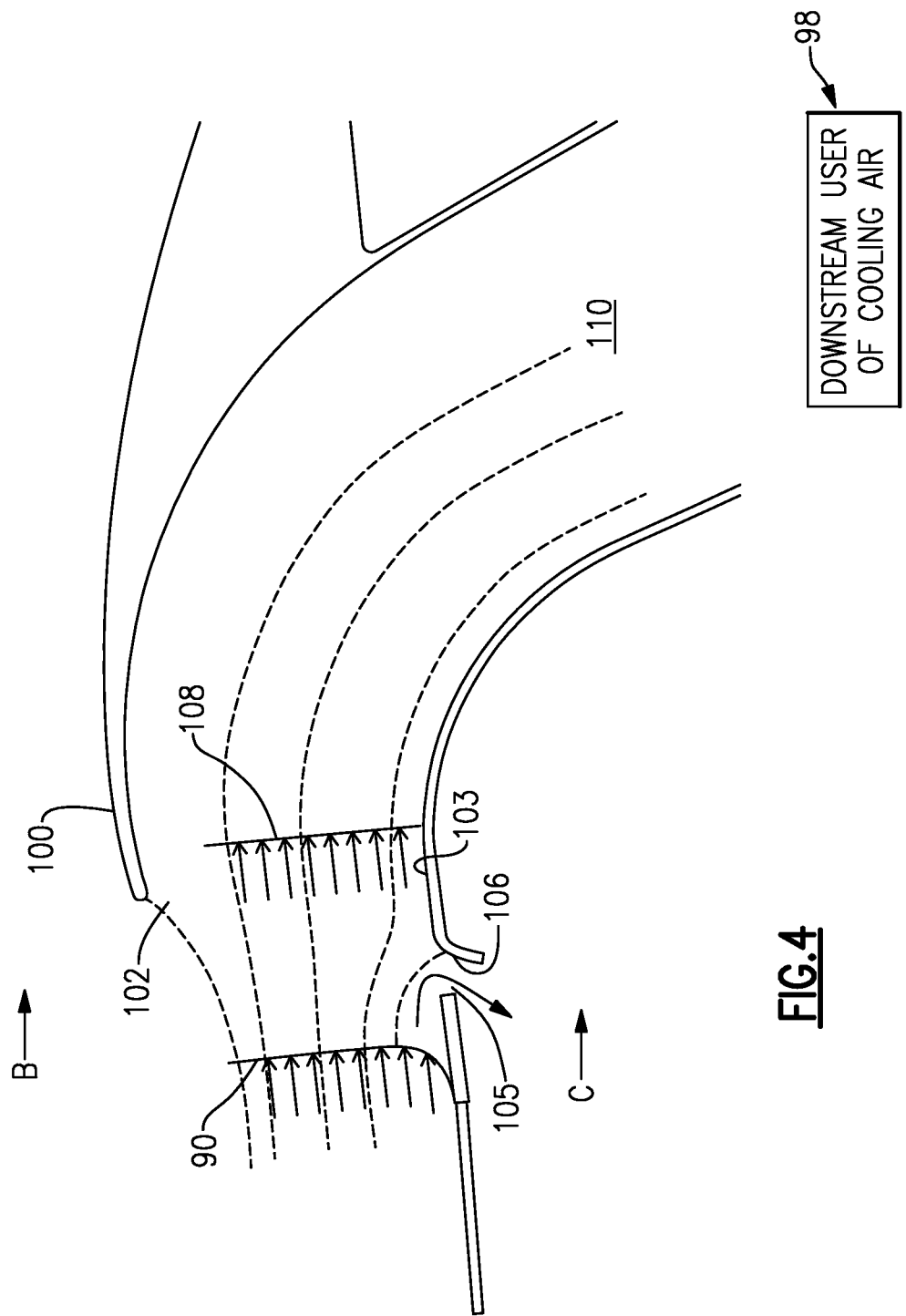
FIG. 4 shows a first embodiment.

FIG. 4 shows an embodiment scoop 100. The scoop 100 has an inlet 102, and delivers air at 110 to a user 98. The same boundary layer profile 90, as illustrated in the prior art, approaches the inlet 102. However, an opening or slot 105 is formed in an inner wall 103 of scoop 100 upstream of inlet 102. A louver or slot 106 is placed at a downstream location in the hole 105 and extends radially inwardly to direct the cooling airflow. The cooling flow is driven into the slot by the pressure difference between the bypass flow B and a core chamber radially inward of inner wall 103. This cooling airflow could be used to replace the holes 84 as shown in FIG. 2. By tapping the air at opening 105, the flow reversal 93 and flow separation profile 94 as shown in FIG. 3 are eliminated, and there is a resulting flat profile 108 downstream of inlet 102. This increases the volume of air reaching the outlet 110, and at which is available for use at the user 98. Elimination of the boundary layer 90 also increases the efficiency of the intake system which improves engine TSFC and allows for a smaller inlet protrusion (ram scoop) into the airstream C. As is clear, the opening 105 extends through the inner wall 103 to communicate to a side of the inner wall 103 remote from the inlet 1 as guided by louver 106.

Figure 5:
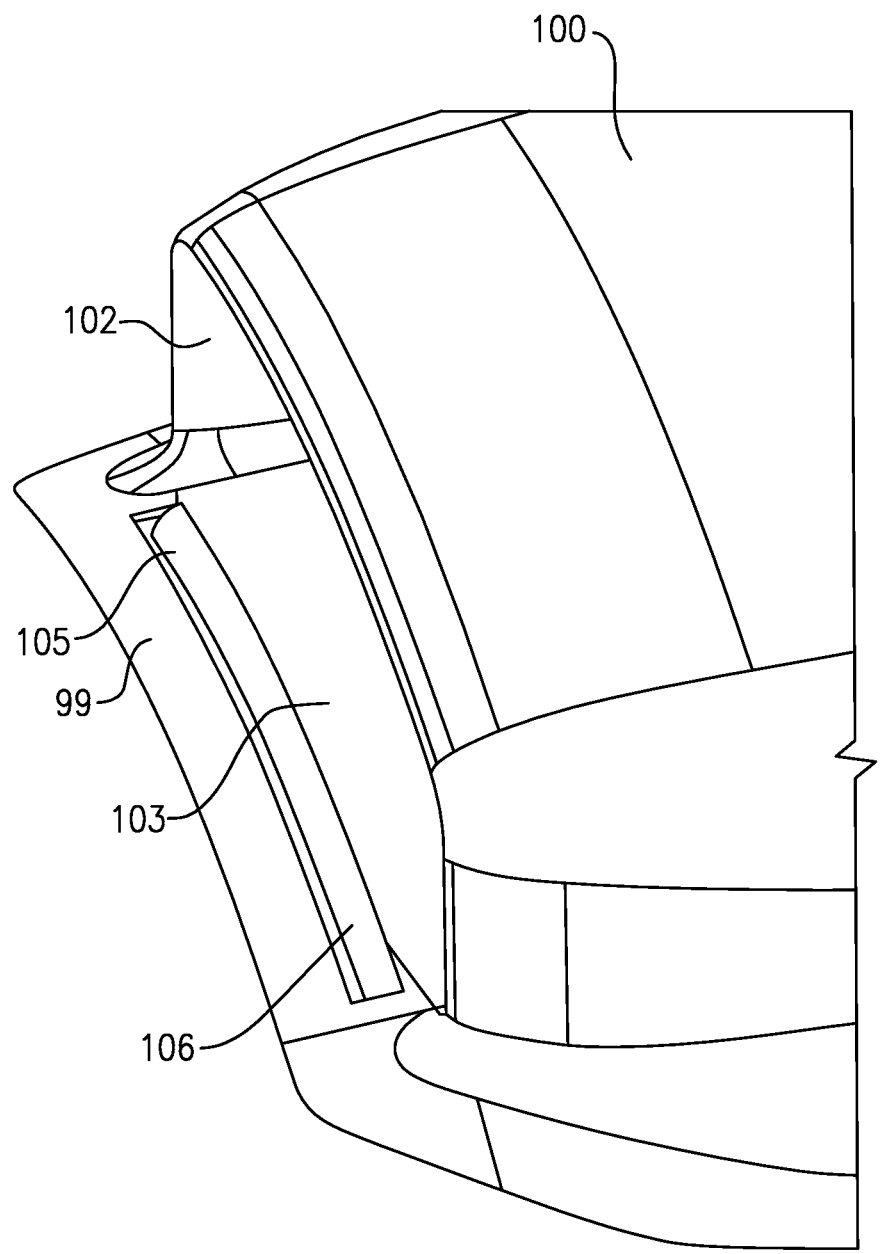
FIG. 5 is a perspective view of the first embodiment.

FIG. 5 shows the scoop 100 having the slot 105 in a forward tab 99, and the louver or deflector 106 extending radially inwardly of the tab 99. Again, the slot 105 communicates air from scoop 100 to a side of the tab 99 remote from the inlet 102.

Figure 6:
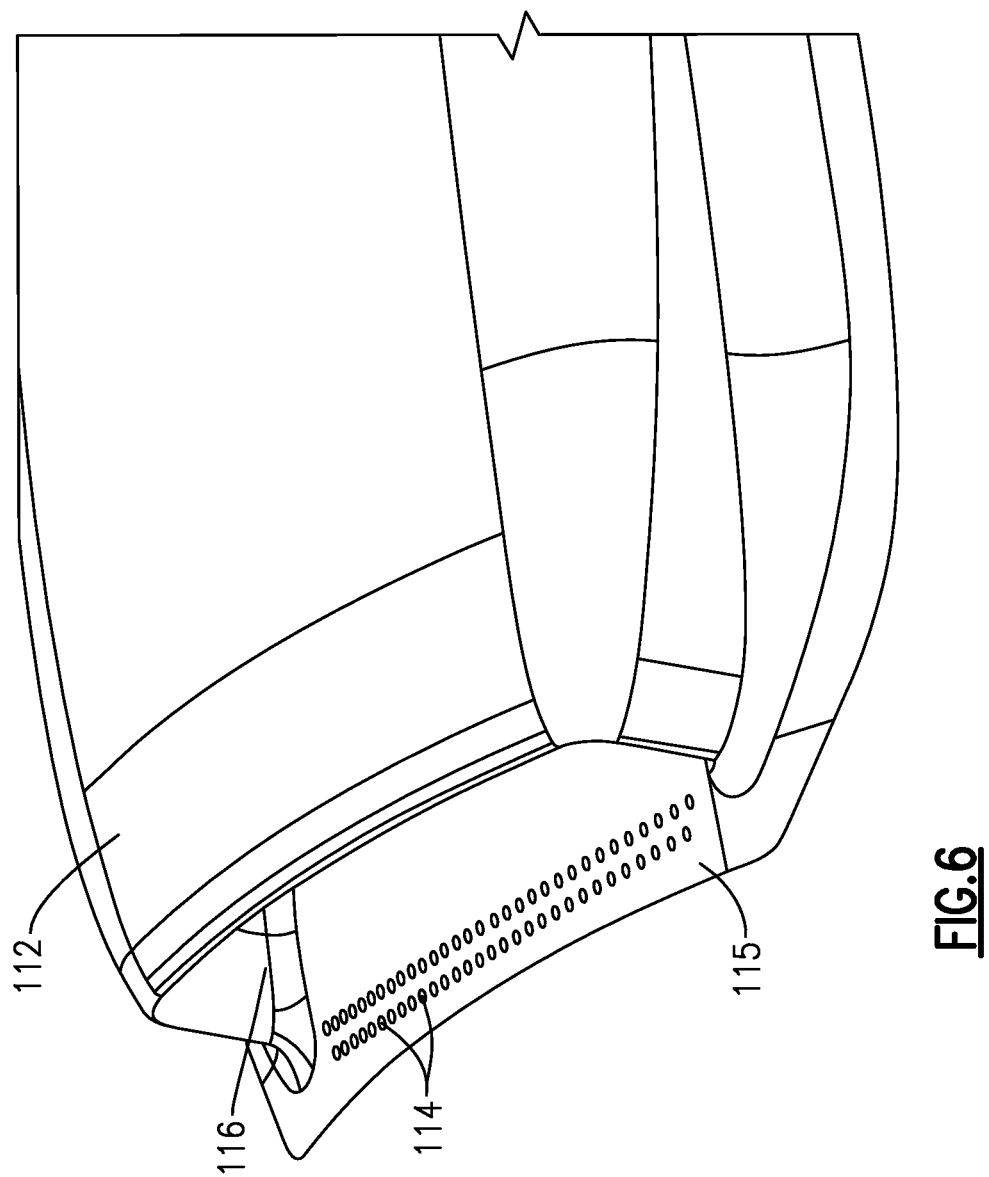
FIG. 6 shows another embodiment.

FIG. 6 shows another embodiment scoop 112, wherein the inlet 116 has an opening formed from a plurality of perforated bleed holes 114 at a location in tab 115, or at a location upstream of the inlet 116. The holes 114 serve the same function as the slot 105.

Figure 7A:
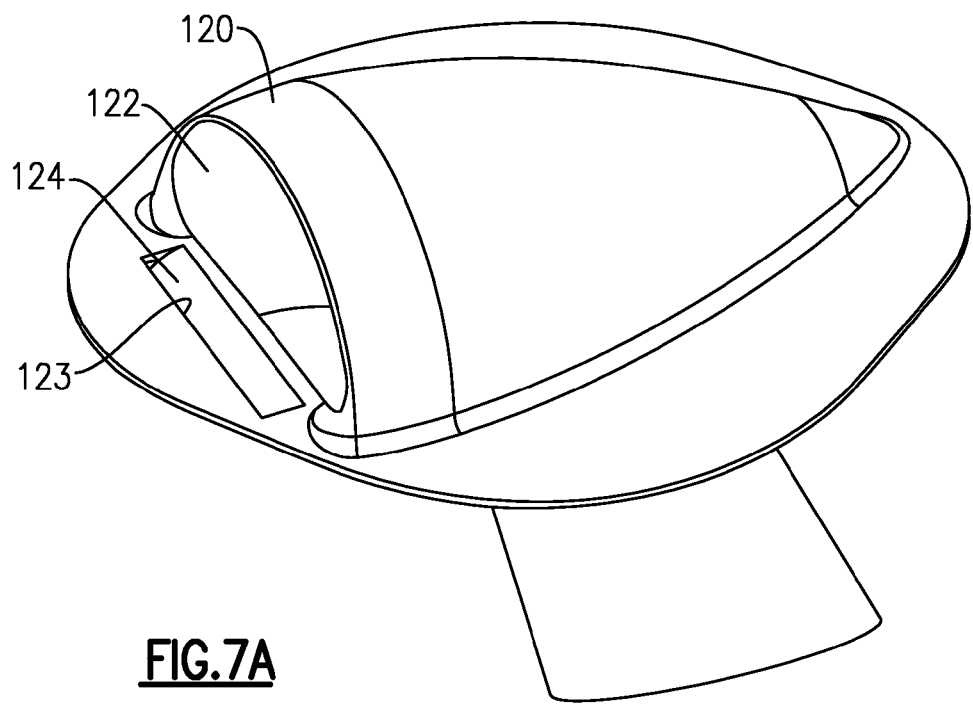
FIG. 7A shows yet another embodiment.

FIG. 7A shows yet another embodiment scoop 120, which is similar to the FIG. 5 embodiment, having a slot 123 with louver 124. The inlet 122 receives air and is positioned downstream of the slot 123 such that the slot 123 will serve to provide the beneficial flow as described in FIG. 4.

Figure 7B:
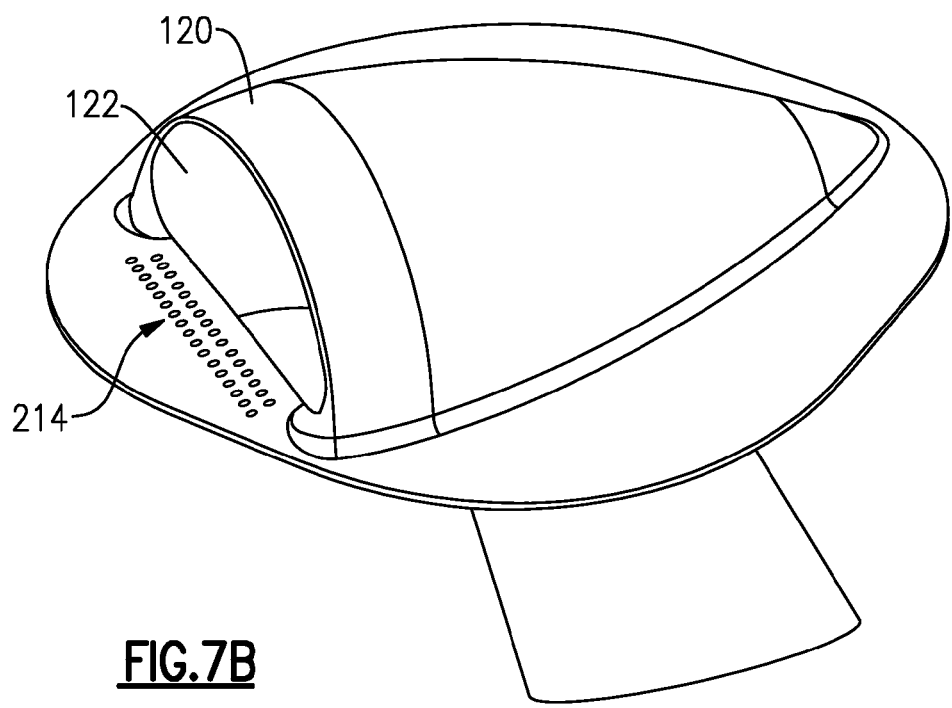
FIG. 7B shows yet another embodiment.

FIG. 7B shows an embodiment much like FIG. 7A except that slot 123 has been replaced by a plurality of perforated bleed holes 214.

Notably, as is clear in FIGS. 5-7, the openings 105/114/123/214 may be formed in the tabs of the scoops 100/112/120, and thus require no change to the nacelle design. Also, the opening 105/114/123/214 are formed upstream of the respective inlets, and at a location where the boundary layer profile 90 will have formed.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A nacelle comprising:
    a nacelle outer wall and a nacelle inner wall spaced radially inwardly of said nacelle outer wall;
    a scoop having a scoop inlet for delivering air from a bypass duct defined between said nacelle inner wall and said nacelle outer wall, and for communicating the air radially inwardly of said nacelle inner wall to a downstream user;
    said nacelle inner wall being provided with at least one opening at a location upstream of said scoop inlet, and said at least one opening extending through said nacelle inner wall to communicate to a side of said nacelle inner wall remote from said scoop inlet; and
    wherein a flow diverter is positioned on a downstream end of said at least one opening, said at least one opening extends radially inwardly of an inner face of said nacelle inner wall.

2. The nacelle as set forth in claim 1, wherein said at least one opening is a single slot.

3. The nacelle as set forth in claim 1, wherein said at least one opening is a plurality of perforated holes in a tab, extending forwardly of said scoop inlet.

4. The nacelle as set forth in claim 1, wherein a boundary layer profile forms at the location upstream of said scoop inlet when air moves into said scoop inlet.

5. A nacelle comprising:
    a nacelle outer wall and a nacelle inner wall spaced radially inwardly of said nacelle outer wall;
    a scoop having a scoop inlet for delivering air from a bypass duct defined between said nacelle inner wall and said nacelle outer wall, and for communicating the air radially inwardly of said nacelle inner wall to a downstream user;
    said nacelle inner wall being provided with at least one opening at a location upstream of said scoop inlet, and said at least one opening extending through said nacelle inner wall to communicate to a side of said nacelle inner wall remote from said scoop inlet; and
    wherein said scoop has a tab extending upstream of said scoop inlet and said at least one opening being formed in said tab.

6. The nacelle as set forth in claim 5, wherein a flow diverter is positioned on a downstream end of said at least one opening, said at least one opening extends radially inwardly of an inner face of said nacelle inner wall.

7. A gas turbine engine comprising:
    a fan for delivering air into a nacelle, and into an inner core;
    a compressor and a turbine disposed in the inner core;
    the nacelle having a nacelle outer wall and a nacelle inner wall spaced radially inwardly of said nacelle outer wall;
    a scoop having a scoop inlet for delivering air from a bypass duct defined between said nacelle inner wall and said nacelle outer wall, and for communicating air radially inwardly of said nacelle inner wall to a downstream user;
    at least one opening in said nacelle inner wall at a location upstream of said scoop inlet, and said at least one opening extending through said nacelle inner wall to communicate to a side of said nacelle inner wall remote from said scoop inlet; and
    wherein a flow diverter is positioned on a downstream end of said at least one opening, said at least one opening extends radially inwardly of an inner face of said nacelle inner wall.

8. The gas turbine engine as set forth in claim 7, wherein said at least one opening is a single slot.

9. The gas turbine engine as set forth in claim 7, wherein said at least one opening is a plurality of perforated holes in said nacelle inner wall.

10. The gas turbine engine as set forth in claim 7, wherein a boundary layer profile forms at the location upstream of said scoop inlet when air moves into said scoop inlet.

11. The gas turbine engine as set forth in claim 7, wherein a pressure difference exists between the bypass duct and an area radially inward of said nacelle inner wall.

12. A gas turbine engine comprising:
    a fan for delivering air into a nacelle, and into an inner core;
    a compressor and a turbine disposed in the inner core;
    the nacelle having a nacelle outer wall and a nacelle inner wall spaced radially inwardly of said nacelle outer wall;
    a scoop having a scoop inlet for delivering air from a bypass duct defined between said nacelle inner wall and said nacelle outer wall, and for communicating air radially inwardly of said nacelle inner wall to a downstream user;
    at least one opening in said nacelle inner wall at a location upstream of said scoop inlet, and said at least one opening extending through said nacelle inner wall to communicate to a side of said nacelle inner wall remote from said scoop inlet; and
    wherein said scoop has a tab extending upstream of said scoop inlet, and said at least one opening being formed in said tab.

13. The gas turbine engine as set forth in claim 12, wherein a flow diverter is positioned on a downstream end of said at least one opening, said at least one opening extends radially inwardly of an inner face of said nacelle inner wall.

* * * * *